United States Patent [19]

Westhaver et al.

[11] Patent Number: 4,639,655
[45] Date of Patent: Jan. 27, 1987

[54] METHOD AND APPARATUS FOR BATTERY CHARGING

[76] Inventors: Lawrence A. Westhaver, 8609 Portsmouth Dr., Laurel, Md. 20708; Ronald E. Ruksznis, 5488 Halflight Garth, Columbia, Md. 21045

[21] Appl. No.: 601,958
[22] Filed: Apr. 19, 1984
[51] Int. Cl.[4] .............................................. H02J 7/04
[52] U.S. Cl. ...................................... 320/14; 320/20; 320/38; 320/40
[58] Field of Search ................. 320/39, 40, 48, 31, 320/22–24, 20, 21, 38

[56] References Cited
U.S. PATENT DOCUMENTS 3,576,487 4/1971 Chase ............................... 320/31 X
4,052,656 10/1977 Lavall et al. ..................... 320/39 X
4,163,934 8/1979 Lawn .................................... 320/23
4,468,605 8/1984 Fitzgerald et al. ............... 320/38 X Primary Examiner—R. J. Hickey
Attorney, Agent, or Firm—Wegner & Bretschneider

[57] ABSTRACT

A method and apparatus are disclosed for charging series connected batteries, particularly nickel cadmium. The means and method described are used for charging single or multiple batteries. In the form of multiple batteries the batteries are charged sequentially in time. A programmed microprocessor controls the constant current source which provides a mean constant charging current to the battery under charge. By monitoring battery voltage during charging the processor will terminate charging when certain conditions occur. In addition, provision is made for termination of battery charging upon occurrence of certain abnormal conditions.

7 Claims, 15 Drawing Figures

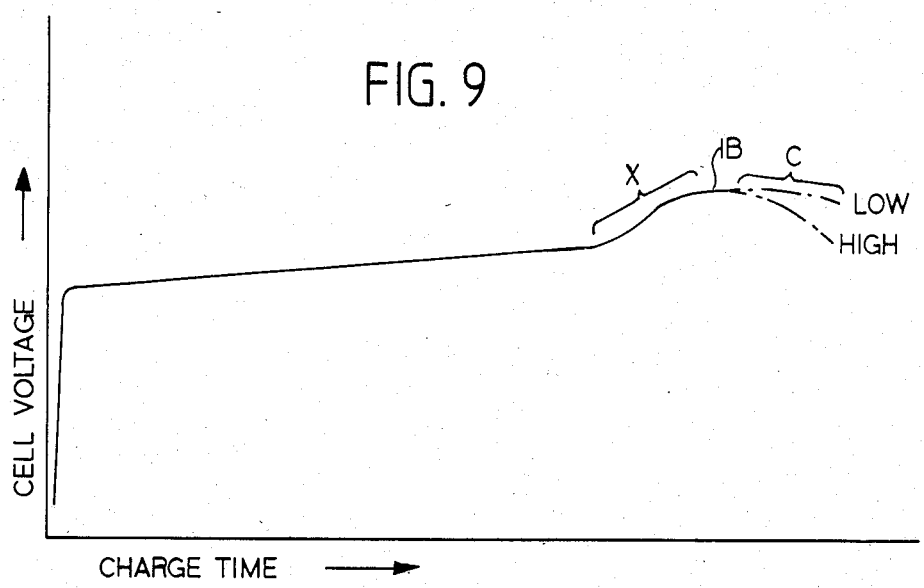

METHOD AND APPARATUS FOR BATTERY CHARGING

BACKGROUND OF THE INVENTION

This invention relates to method and apparatus for charging batteries and providing for terminating the charging of a battery in order to reduce the likelihood of damage to it. The invention, although not so limited, has particular application to the charging of nickel cadmium batteries, and in this application provides the least likelihood of excessive heat and pressure buildup occurring within the cells of the battery while still achieving a full charge.

It is known from the prior art that in order to remove possible imbalances among battery cells they can be discharged individually. Such discharging additionally tends to eliminate the "memory" effect common to such batteries. Certainly, a feature such as this one could be added to the invention described herein.

In addition it is known that it is desirable to terminate charging of a nickel cadmium battery upon the occurrence of a zero or negative rate of change of battery or cell voltage with respect to time. The art describes apparatus by which this occurrence can be sensed and charging terminated. In operating in this manner, however, it is required that the battery be vented or in the case of sealed cells be constructed to withstand high internal pressures while having the capability of maintaining a high rate of chemical recombination. High pressures and elevated temperatures occur in sealed nickel cadmium cells near the end of a fast charging cycle. During this period only a small percentage of additional charge is stored, and the balance will simply be dissipated as heat.

It is therefore an object of this invention to provide means and method for charging batteries which will permit the charging cycle to be terminated prior to a point where there would be a substantial increase in temperature or pressure within the cells of the battery.

It is another object of this invention to provide means and method for charging batteries which will permit charging at a relatively rapid rate those batteries which might be designated as "slow charge" batteries.

Another object of this invention is to provide means and method for charging nickel cadmium batteries at a high rate while providing the capability of terminating the charging substantially before the battery fully enters its "gas" phase.

SUMMARY OF THE INVENTION

The foregoing and other objects are obtained in accordance with the invention in a system that will charge batteries, particularly nickel cadmium batteries, at a high rate while terminating the charging substantially before the battery fully enters the "gas" phase. The battery voltage is measured soon after charging current is applied, and this voltage measurement is used to estimate the number of cells in the battery pack. A voltage limit is calculated on the basis of the voltage measurement for the particular battery which, if reached, will cause charging to be terminated.

The initial estimate of the number of cells in the pack also allows the subsequent rate of voltage increase to be assessed. For example, a twelve cell battery would be expected to have a rate of voltage increase 20 percent greater than a ten cell battery. After an initial voltage measurement is made, the subsequent rate of voltage increase is determined, the value stored and compared with empirically determined values. Based on that comparison a time limit is set for the charging process.

The stored value of rate of voltage increase is multiplied by an empirically determined value, and subsequent rates of voltage increase are compared to it. When the battery exhibits a rate of voltage increase equal to that rate it is an indication that the battery is just beginning to enter the "gas" phase. At that point fast charging is terminated.

In those situations in which a substantially charged battery is to be additionally charged the voltage characteristics will not permit charge and termination by the method described above. Since the slope of the voltage characteristic will normally be a maximum at the beginning and subsequently decrease, termination will be by means of a detection of a zero increase in voltage within a predetermined time period.

The invention contemplates that there are four normal conditions which will cause charging to be terminated: (1) reaching the calculated voltage limit, (2) reaching a predetermined time limit, (3) reaching a calculated rate of voltage increase or (4) a zero voltage increase within a specified period of time.

BRIEF DESCRIPTION OF THE DRAWINGS

FIG. 9 is a characteristic curve for the cell voltage versus charging time characteristic for a typical nickel cadmium cell which is undergoing a constant current charge.

DETAILED DESCRIPTION OF THE PREFERRED EMBODIMENTS

Figure 1:
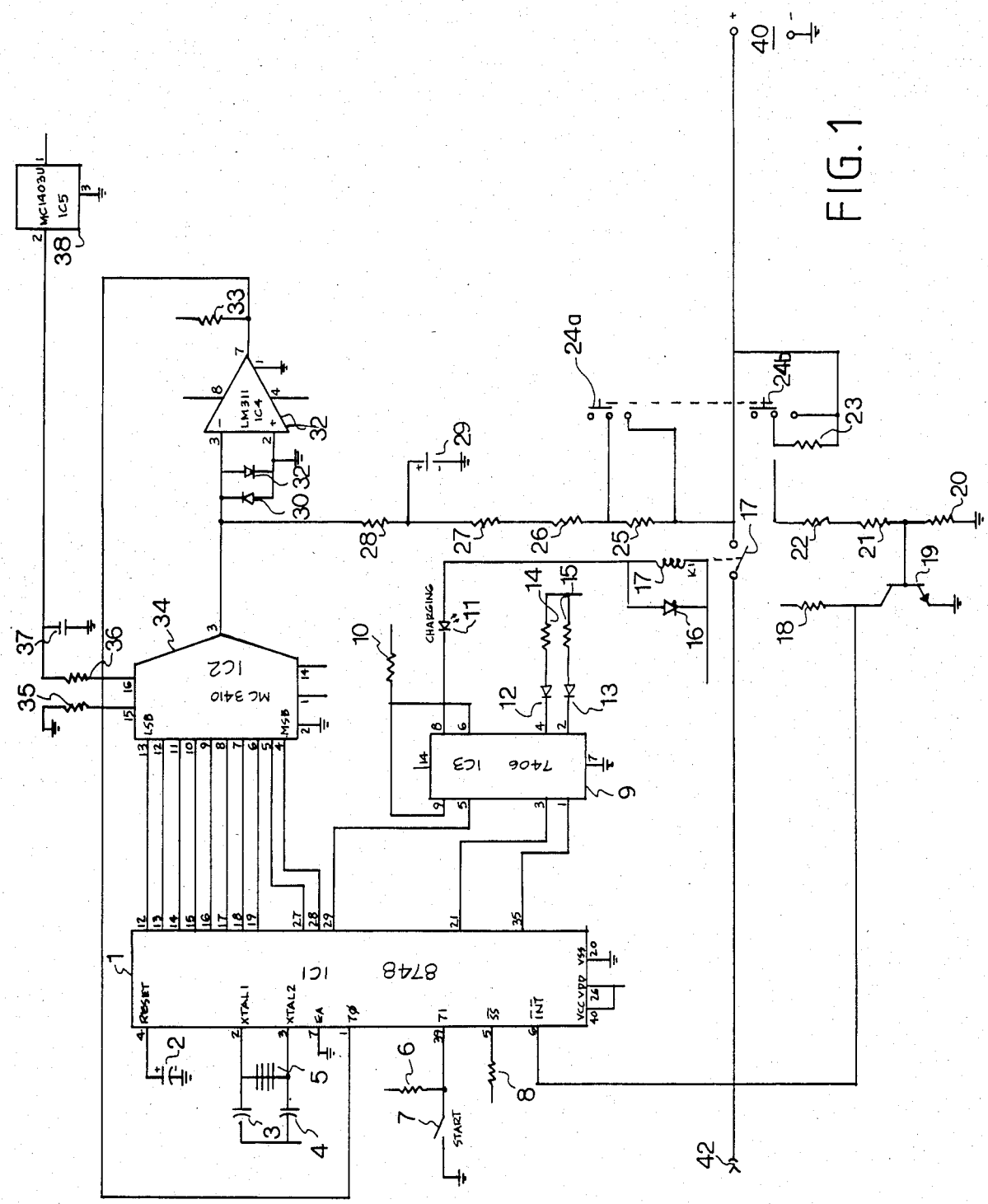
FIG. 1 is a schematic diagram of a first embodiment of control circuitry for a battery charging apparatus constructed according to the principles of the invention.

The FIG. 1 embodiment operates to control the supply of a charging current from terminal 42 to a battery pack connected to terminals 40. These operations are monitored and controlled by a standard type 8748 microprocessor 1. The latter has pins 12 through 19 forming the bus port and pins 27 and 28 connected to the inputs of a ten bit digital to analog converter 34. In this embodiment the digital to analog converter has a full scale output current of −4 ma. The latter assumes all logic ones on the ten input lines.

Resistors 35 and 36 perform the function of setting a full scale output current in conjunction with a precision voltage reference source 38. Capacitor 37 is connected in parallel with the latter source to perform a conventional filtering function.

A digital to analog converter 34 having inputs connected to pins 12 through 19 and pins 27 and 28 of microprocessor 1 produces an output current from pin 3 which is applied to an inverting input (pin 3) of a comparator 32. In this particular example the input of the comparator is clamped to be within + or −0.6 volts of ground by the action of reversed diodes 30 and 31, respectively, connected from pin 3 to ground. Resistors 25, 26, 27 and 28 are likewise, connected to the inverting input of comparator 32 to provide a precision current value to the inverting input of the comparator that is porportional to the voltage of the specific battery pack connected for charging. In this case it will be assumed that nickel cadmium batteries are being used. The values of resistors 25 through 28 are such that the battery voltage measurement range is up to 24 volts. This assumes that switch 24a is in the position for charging batteries having ten to twelve cells. Should switch 24a be operated to the 20 through 24 cell position the battery voltage measurement range will be up to 48 volts.

An open collector output of the comparator 32 is provided with a "pull-up" resistor 33 and is connected to the T0 pin of microprocessor 1. The logical state of the comparator output indicates whether the current from digital to analog converter 34 or the current from the battery connected to resistor string 25–28 is greater. By these means, the microprocessor in effect performs an analog to digital conversion to determine the voltage of the pack connected for charging.

A capacitor 2 is connected to reset pin 4 of the microprocessor to provide a "power-on" reset. This causes program execution to begin at location 000 which initializes the ports and registers in preparation for execution of a charging routine.

A quartz crystal 5 and capacitors 3 and 4 provide the clock frequency for operation of microprocessor 1. In this case the frequency output of the clock is at 3 MHz.

A resistor 6 is connected to the T1 input of microprocessor 1 and it enables the microprocessor to recognize operation of a start push button switch 7.

Resistor 8 is connected as shown to hold the SS input to microprocessor 1 at a logical one. This is necessary for routine operation of the microprocessor 1.

Integrated circuit 9 includes six open collector inverter-buffers one of which provides the current drive for the coil of a charging current control relay 17. Diode 16 is connected to suppress transients when the current to relay 17 is interrupted. The latter is in series with a charging LED indicator 11. LED indicator 12 indicates finished charge, and it is in series with a current limiting resistor 14 which in turn is driven by an inverter-buffer. The inverter buffer drives the error LED 13 which is in series with resistor 15. A double inversion is required to drive the relay and the intermediate buffer output is pulled-up by means of resistor 10.

Due to the fact that the charging current is supplied by a constant current source having a high open circuit voltage, a protection circuit has been incorporated that will generate an interrupt signal to the microprocessor and allow it to operate to prevent damage to precision resistors 25 through 28.

The battery pack output, connected at terminals 40, is connected to a voltage divider consisting of resistors 20 through 23, connected as shown. These will operate to turn on transitor 19 if the voltage of the battery pack output exceeds a limit set by the position of switch 24b. If transistor 19 is turned on, a logical zero will be present at the interrupt input of the microprocessor at pin 6. An interrupt service routine will be executed by the microprocessor 1 to disconnect the relay. In normal operation the collector pull-up resistor 18 holds the interupt input at a logical one.

A source of charging current connected at terminals 42 may be any conventional constant mean current source of, in this example, four amperes. If a pulsed current source is used, a capacitor 29 will reduce the noise generated by the pulsed current source in order that comparator 32 will only respond to the average direct current voltage level of the battery. There is no provision in this embodiment for application of a "topping" charge after completion of the main charge. Moreover, this embodiment makes no provision for a preliminary discharge before charging.

In using this embodiment to prevent damage to slow charge packs a voltage limit is established which is 12.5 percent above the "knee" voltage (as defined below). Slow charge cells will thus be terminated before fully entering the gas phase of charging. This voltage limit is predicted upon the measurement of the knee voltage. After application of charging current, three minutes are allowed for the voltage to reach a level of 13.54 volts. If the voltage does not reach this level within the allotted time, it is known then that one or more cells are short circuited or reversed. Under this condition charging is terminated and the fault light is lit. When the 13.54 volt level is reached within three minutes, one additional minute is allowed for the pack to settle, and a measurement of the pack voltage is made. This initial measurement is used to set the voltage limit for the pack at a 12.5 percent higher value, and to determine the number o cells in the pack. In this case the pack is determined to be a ten cell pack if the initial measurement is between 13.54 and 14.83 volts. If the voltage is between 14.83 and 16.25 volts, the pack is judged to be an eleven cell pack. If the voltage is above 16.25 volts the pack is determined to be a twelve cell pack. This initial determination of the number of cells in the pack allows the subsequent rate of voltage rise to be assessed. After the initial voltage measurement is made, the subsequent rate of voltage rise is determined, the value stored and compared to empirically determined values. Based on the result of the comparison a one hour limit or a 1.75 hour time limit is set for the charge cycle.

In the foregoing discussion reference is made to a "knee" voltage. In order to facilitate an understanding of the operational definition of knee voltage reference is made to the following discussion of the typical cell voltage versus charging time characteristic for conventional nickel cadmium cells in conjunction with FIG. 9 in which an exemplary characteristic curve is shown. This characteristic curve is for a nickel cadmium cell undergoing a constant current charge. Should there be variations in environmental conditions, such as temperature or the like, or should the construction of the cell be changed, there will, of course, be variations in the cell voltage. However, in general, the overall characteristic of the curve itself will change from its illustrated form only slightly. An increasing rate of charge may foreshorten the curve and increase the voltages shown; while the converse will occur when the rate of charge is decreased. When a discharged cell is initially connected for charging, it will experience an initial rapid increase of cell voltage which is followed by a much slower rate of increase during the remainder of the charging period. As the end of the charging period is reached, the positive electrode of the cell, which in this case is nickel, will begin to evolve oxygen. Thus, as the region of this curve identified by the letter A is reached, there is a more rapid increase of cell voltage, and this indicates the start of oxygen evolution. Stated another way, the charging cell has entered its "gas phase". It is in this region of the curve that the charging. current begins to primarily evolve oxygen and secondarily to charge the cell, but the cell voltage will continue to rise until it reaches the point where charging is complete. This point is indicated by the letter B. Following this point in region C of the curve there will be no further increase in cell voltage. It is in region C where variations in the curve shape can occur. These changes are brought about by the presence of high or low charging currents.

In reviewing the overall configuration of the charging curve it will be seen that the slope (dV/dT) or the rate of change of cell voltage with time is positive during the entire period of useful charging. At a point X on the curve, prior to point B, the slope of the charging curve will begin to decrease. It is this point X which is referred to herein as the "knee" voltage.

If left uncontrolled, the charging operation will continue through region A to point B where the curve will assume a zero slope; at this point no further useful charging can occur. Should the charging current be maintained past the point of full charge, the result will be an increase in cell temperature which indicates that excess energy is being dissipated as heat. During overcharging a reduction of cell voltage can occur, as shown in region C, and this is due to a rise in the temperature of the cell coupled with the negative temperature coefficient of voltage which is customarily exhibited by nickel cadmium cells. As pointed out hereinabove, overcharging of a sealed nickel cadmium cell at the high currents which must be used for rapid charging can cause a rupture of the cell due to high internal pressures.

The rate of pack voltage rise which was measured and stored is multiplied by four, and it is compared with the subsequent rate of pack voltage rise. When the pack voltage rate of increase becomes equal to four times the initial rate, it is an indication that the pack is beginning to enter the "gas" phase and charging is terminated.

In situations where a fully charged pack is inadvertently placed on charge the voltage characteristic will not permit the foregoing mode of charge termination. Since the slope of the characteristic will be at a maximum at the beginning, it may subsequently decrease; in this event termination of charging will be by means of the maximum voltage being reached or by the slope of the characteristic becoming zero or negative.

In summary, there are four modes under which charging may be terminated: (1) reaching the time limit, (2) reaching the voltage limit, (3) a four-fold increase in the voltage slope and (4) zero or negative voltage slope.

Figure 2:
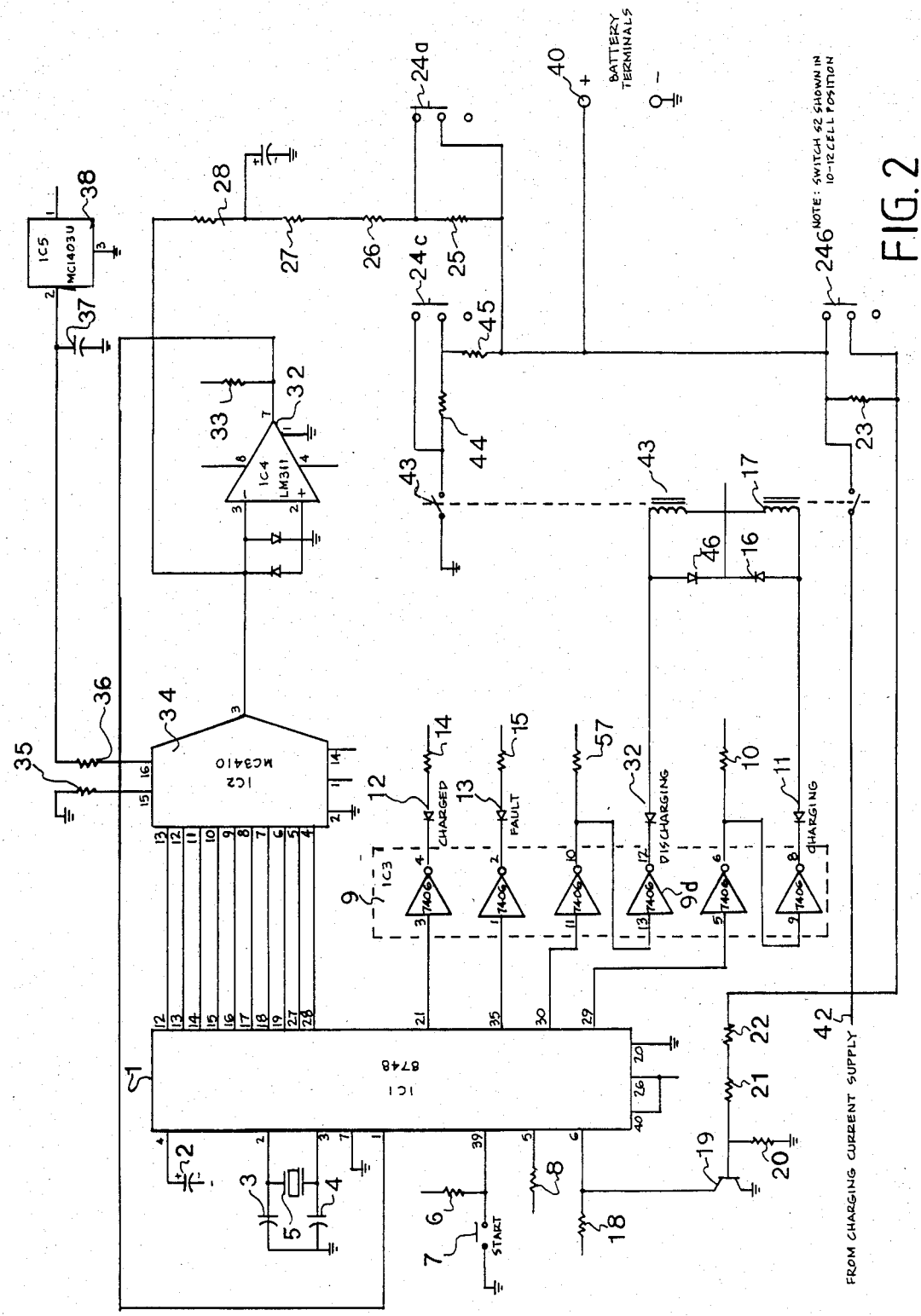
FIG. 2 is a schematic diagram of a second embodiment of a control circuit for a battery charging apparatus constructed according to the principles of the invention.

FIG. 2 illustrates a second embodiment of a control circuit for a charging system constructed according to the principles of the invention, and this circuit is a modification of the FIG. 1 embodiment. Accordingly, like reference numerals in FIG. 2 correspond with similarly identified components in FIG. 1.

In this embodiment an additional relay coil 43 is added for connecting the battery pack to a load resistance for discharging prior to charging. An available type 7406 buffer in integrated circuit 9 drives the latter relay. A logical double inversion is accomplished with resistor 51 providing the "pull-up" for the intermediate buffer. The discharge LED indicator 52 is series connected with the coil of relay 43, and is operated when the relay is operated.

Diode 46 suppresses the inductive transient caused by the interruption of the coil current. It will be noted that switch 24 has an additional section C. The latter, when closed, connects only resistor 45 as the discharge load, while when opened causes the combination of resistors 44 and 45 to form the discharge load.

Figure 3:
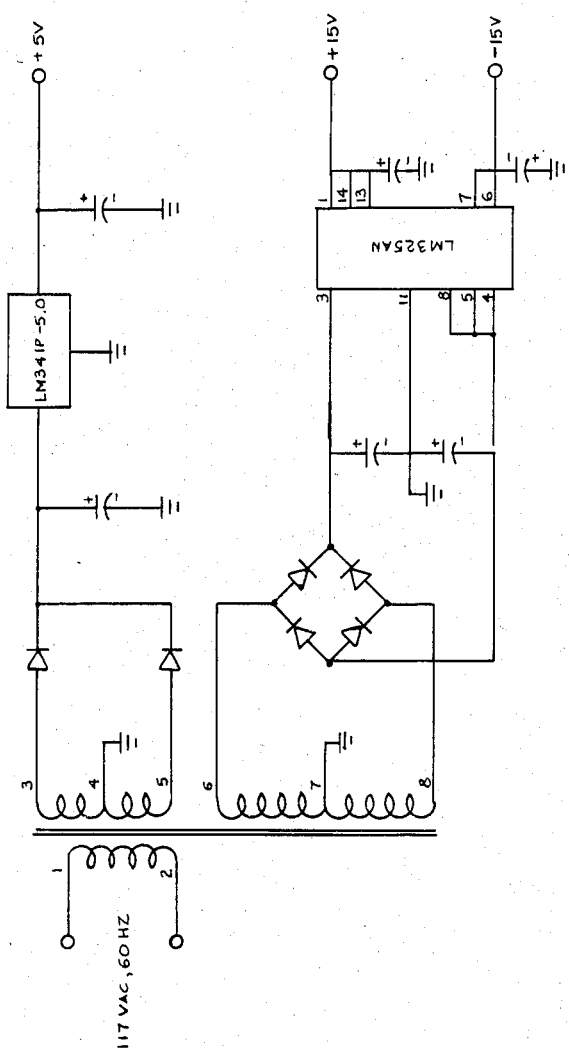
FIG. 3 is a detailed schematic diagram of a suitable power supply for the control circuits of FIGS. 1 and 2.
Figure 4A:
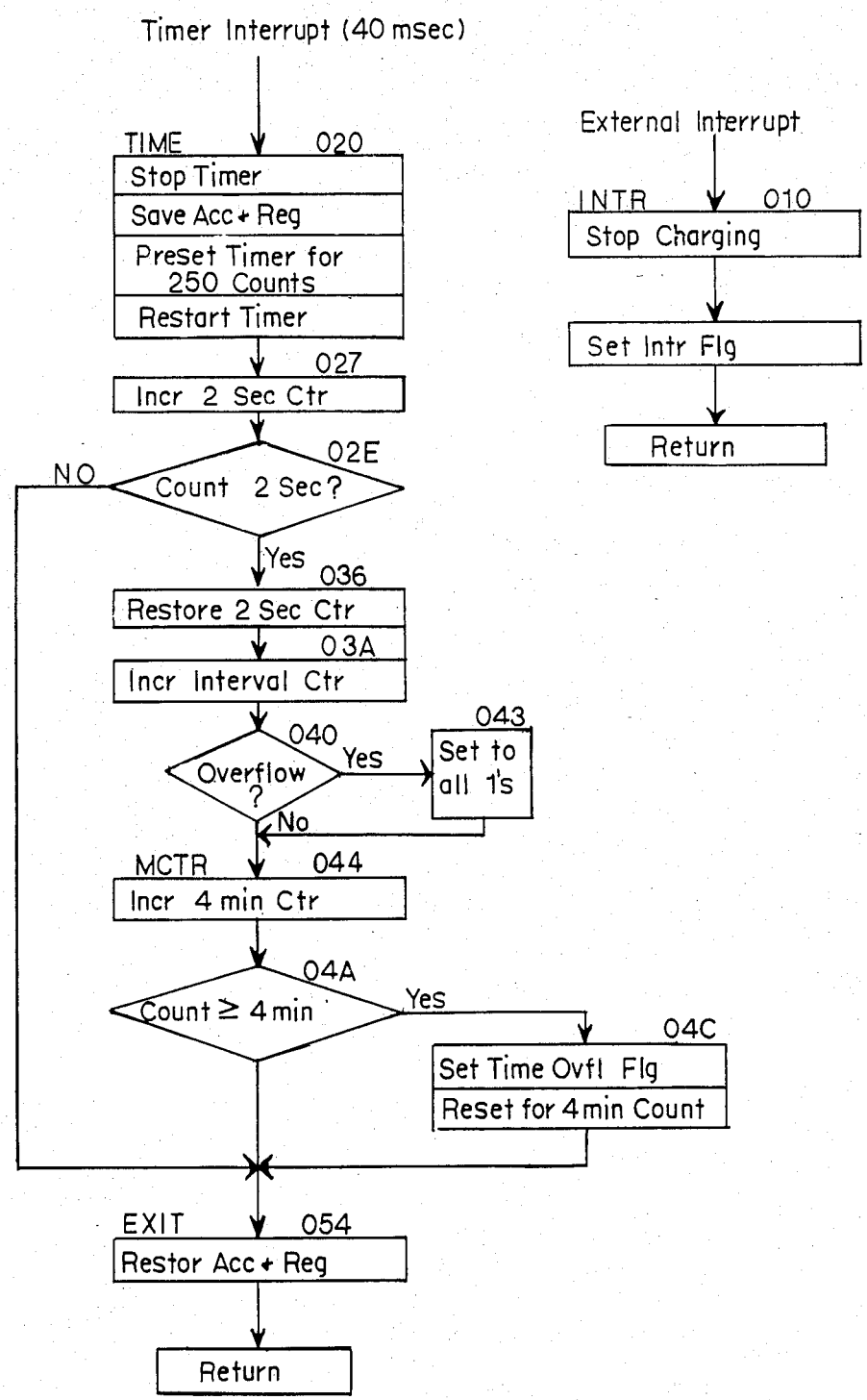
FIGS. 4a-g constitute a detailed flow diagram illustrating the sequence of operation carried out by the FIG. 2 embodiment.
Figure 4B:
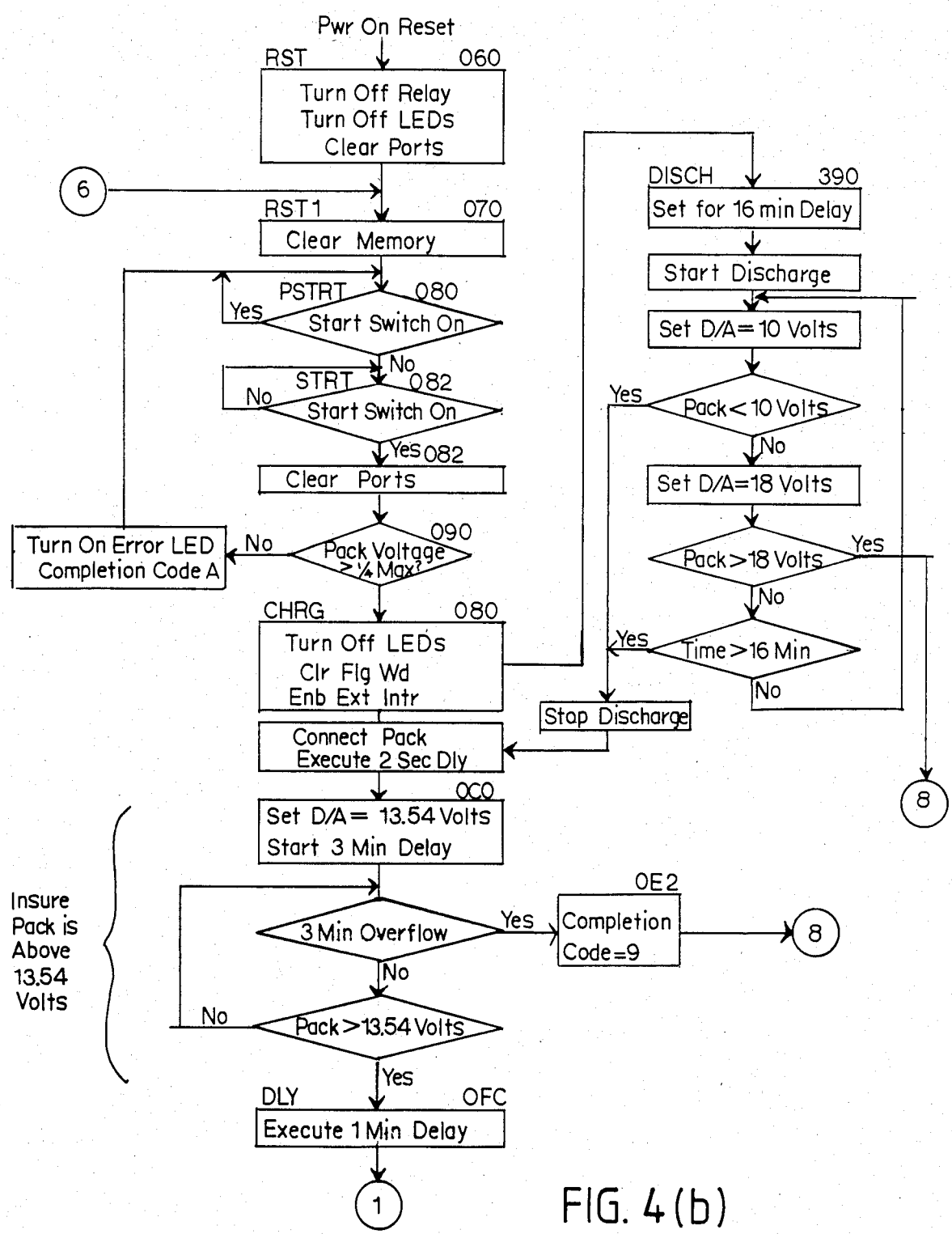
Figure 4C:
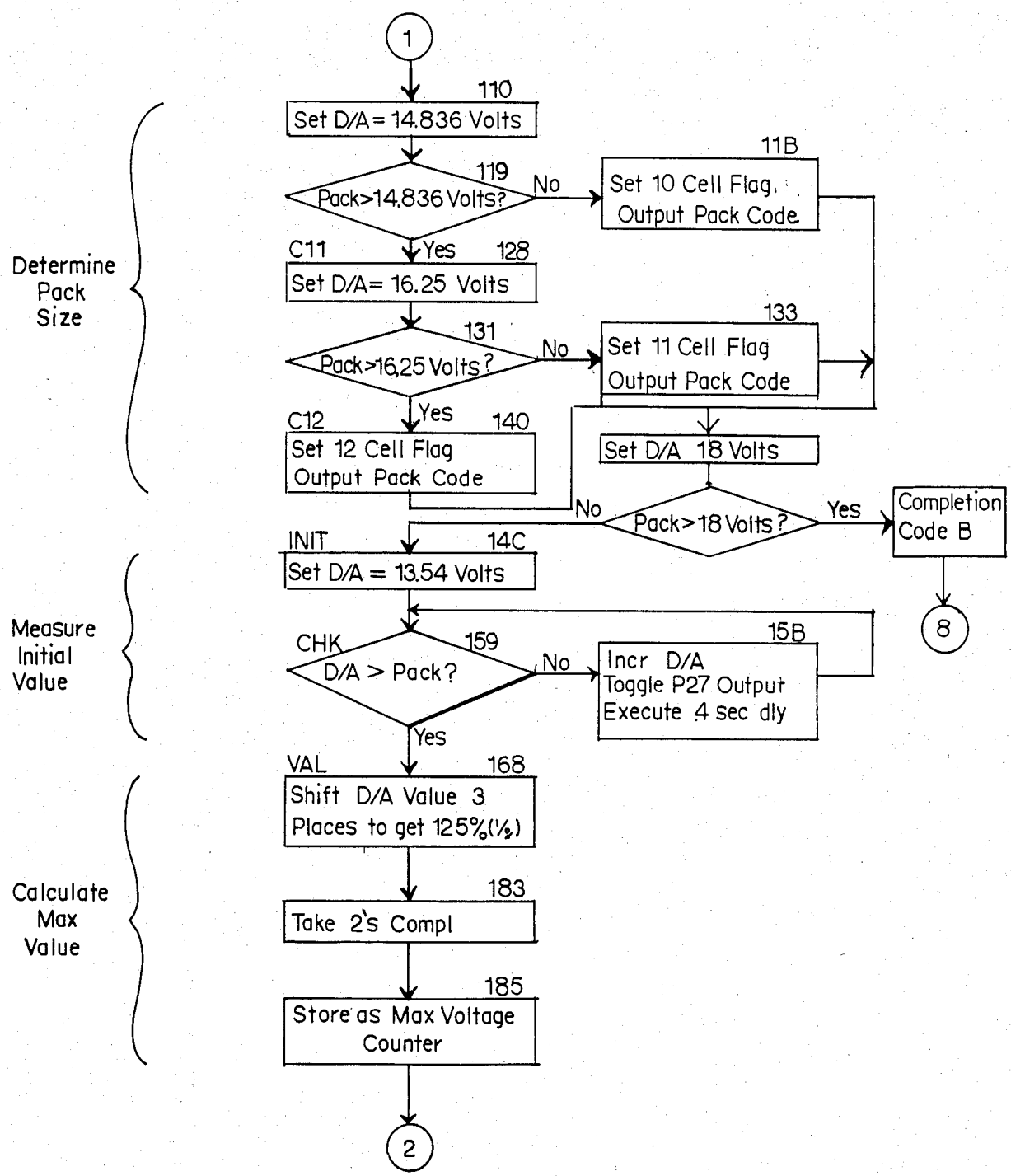
Figure 4D:
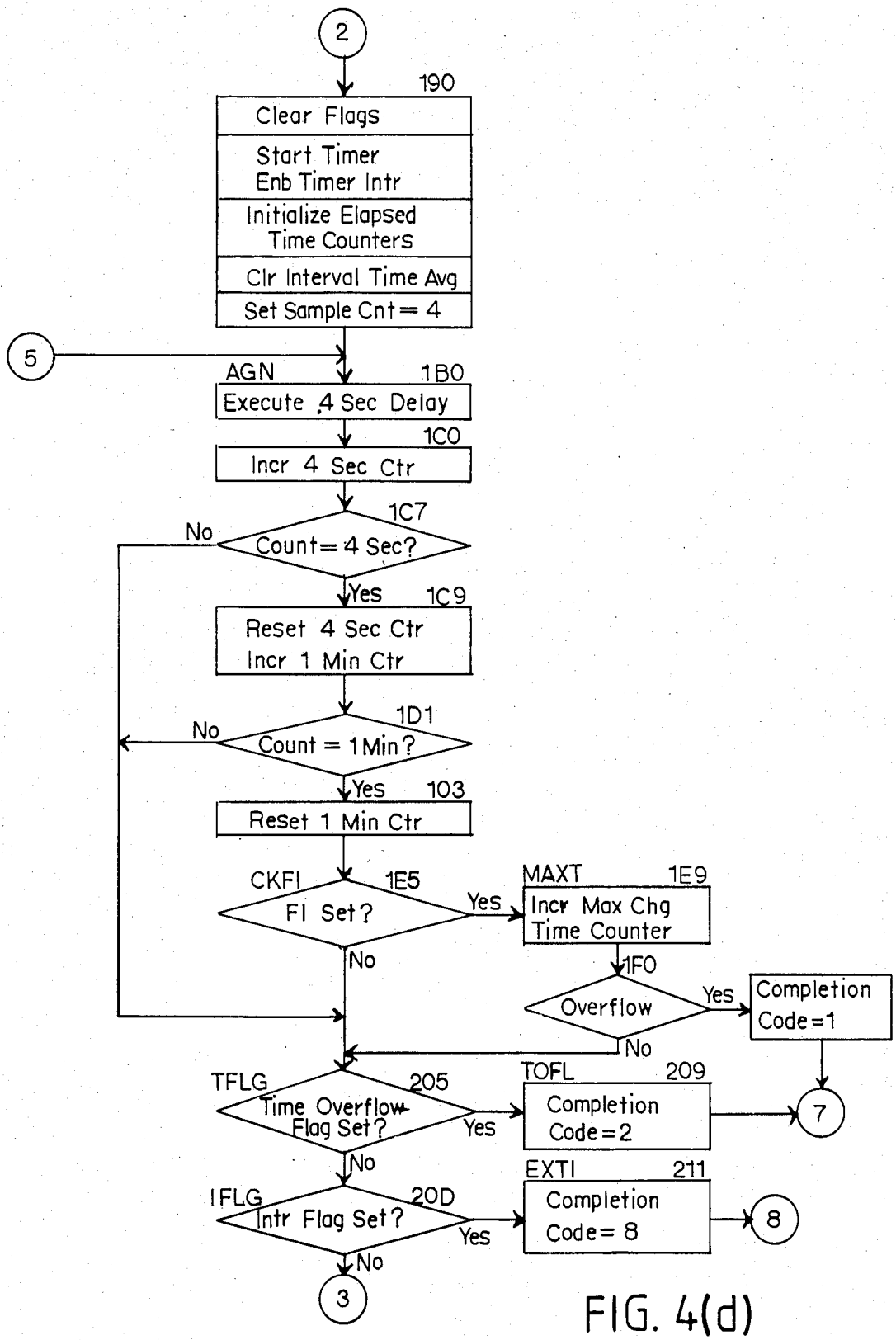
Figure 4E:
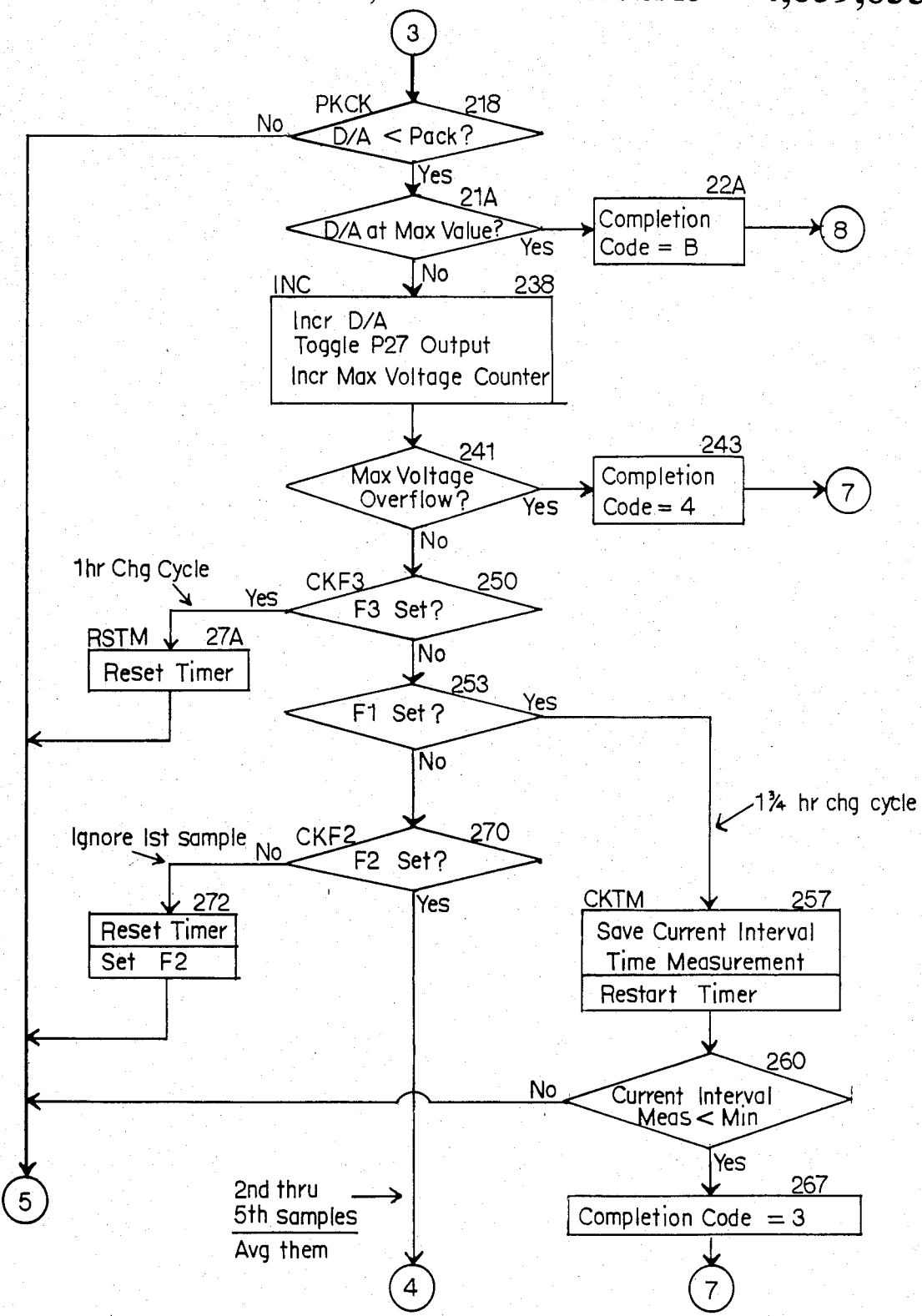
Figure 4F:
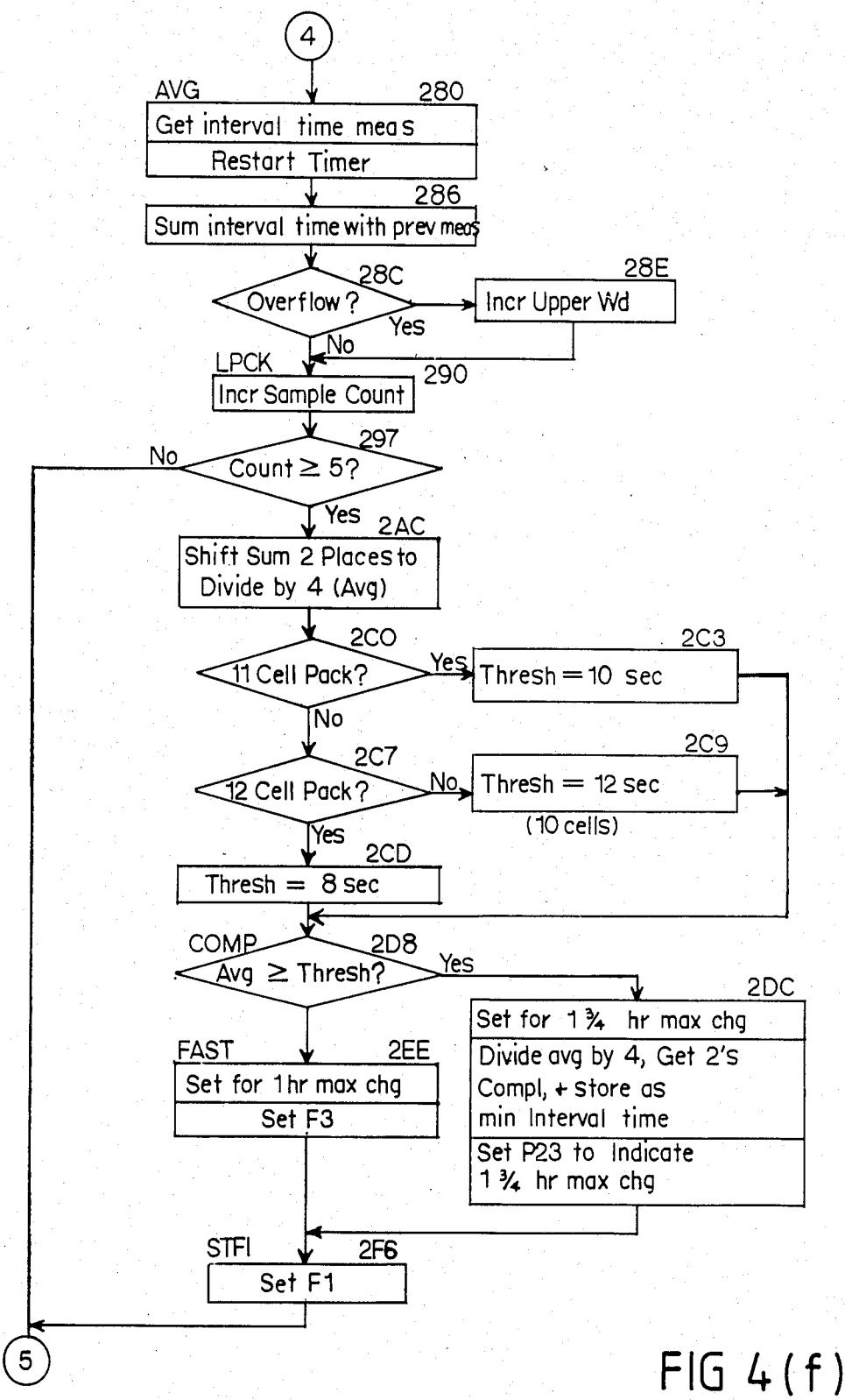
Figure 4G:
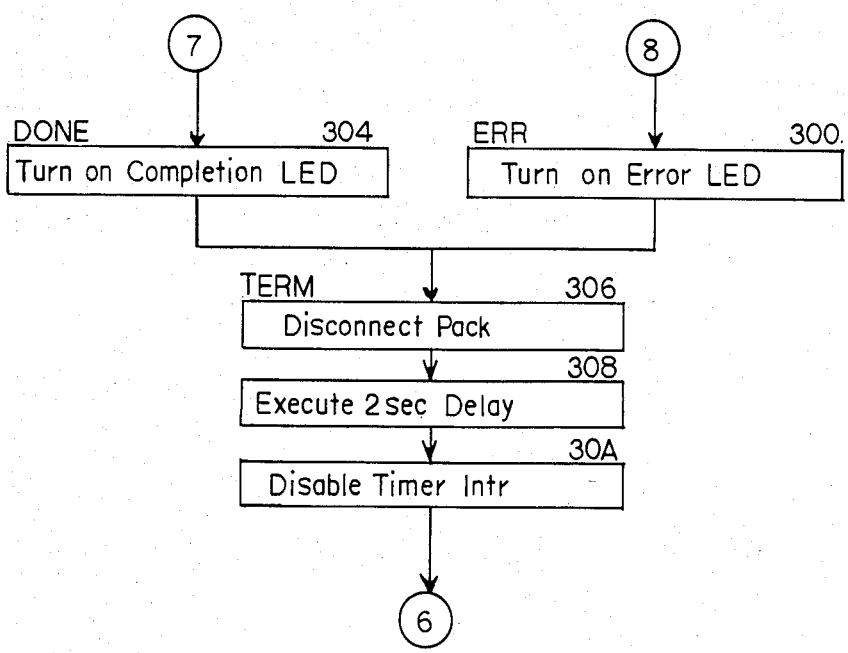

FIG. 3 is simply a detailed schematic diagram of a conventional power source which provides the power supply for use in connection with either the FIG. 1 or FIG. 2 embodiments. In view of the very conventional nature of its construction and operation no further description will be given.

A program for FIG. 1 provides an initial discharge of the battery for sixteen minutes or to a battery voltage of 10 volts whichever occurs first. This procedure allows microprocessor 1 to assess the size of the pack by ensuring that there will never be a fully charged pack placed on charge.

The program for FIG. 2 differs from the above program in that there is no time limit placed on the discharge so that the pack is discharged to a level of 10 volts. This nearly complete discharge before entering the charging routine is the preferred method in that it prevents the battery from acquiring a "memory problem". The interconnected portions of FIG. 4 form a flow diagram illustrating the operation of the program of FIG. 1.

Briefly, the funtional steps being carried out in FIG. 4 are as follows:

1. A power on initialization routine sets up the ports and clears the memory.

2. A stop and wait instruction is provided for the start switch to be activated.

3. The system checks for minimum voltage on the pack to verify that a pack is connected before starting the charge. It also checks for an abnormally high voltage; the latter would indicate that the range switch is misset or an improper pack is installed.

4. The pack is discharged until it reaches 10 volts or has been discharging for sixteen minutes.

5. Charging is initiated and it is verified that a pack reaches in this example 13.54 volts within three minutes. This provides some assurance that there are no dead or reversed cells. If this value is not reached, charging is stopped.

6. The pack size is determined based on the knee voltage. This allows comparison of the rate of voltage increase with expected threshold values.

7. The knee voltage is measured and a value which is 12.5 percent of the measured voltage is calculated. A voltage limit is placed on the pack which is equal to the knee voltage plus 12.5 percent. This will allow slow charge packs to terminate charging before they fully enter the gas phase.

8. Four measurements are made of the time period required for digital to analog converter 34 to increment, and a value corresponding with the average of these measurements divided by four is stored. By comparing the subsequent rate of voltage increase with the stored value, charging may be terminated when the rate becomes equal to or greater than four times the initial rate.

9. The average time period required to increment the digital to analog converter, which was calculated in step 8, is compared to a threshold value based upon a determination of the pack size, as determined during step 6. Using this information a time limit is selected, and in this case, it is either 1 hour or 1.75 hours. Generally if a pack voltage is rising so that charging would be expected to be complete in an hour or less, the 1 hour limit would be set. A slower rate of rise would cause the 1.75 hour limit to be used.

10. Assuming that digital to analog converter 34 is incremented at a minimum rate it may be expected that charging will terminate normally by one of four limits being reached; (1) time, (2) rate of voltage rise below the minimum, (3) reaching a calculated voltage limit (1.125×knee voltage) (4) or the rate of voltage rise having become greater than four times the initial rate just after the knee voltage had been reached.

11. In the event of the occurrence of one of the abnormal condition charging will be terminated. These conditions are as follows: the voltage measurement limit of the digital to analog converter being reached, insufficient initial battery voltage, or excess initial voltage indicating that the range switch is misset or a pack is connected that is out of range or finally, the battery does not reach the minimum required voltage after three minutes of charging which indicates possible shorted or reversed cells. In addition, if the series charging connection is opened, an external interrupt to the microprocessor will cause termination.

Figure 5:
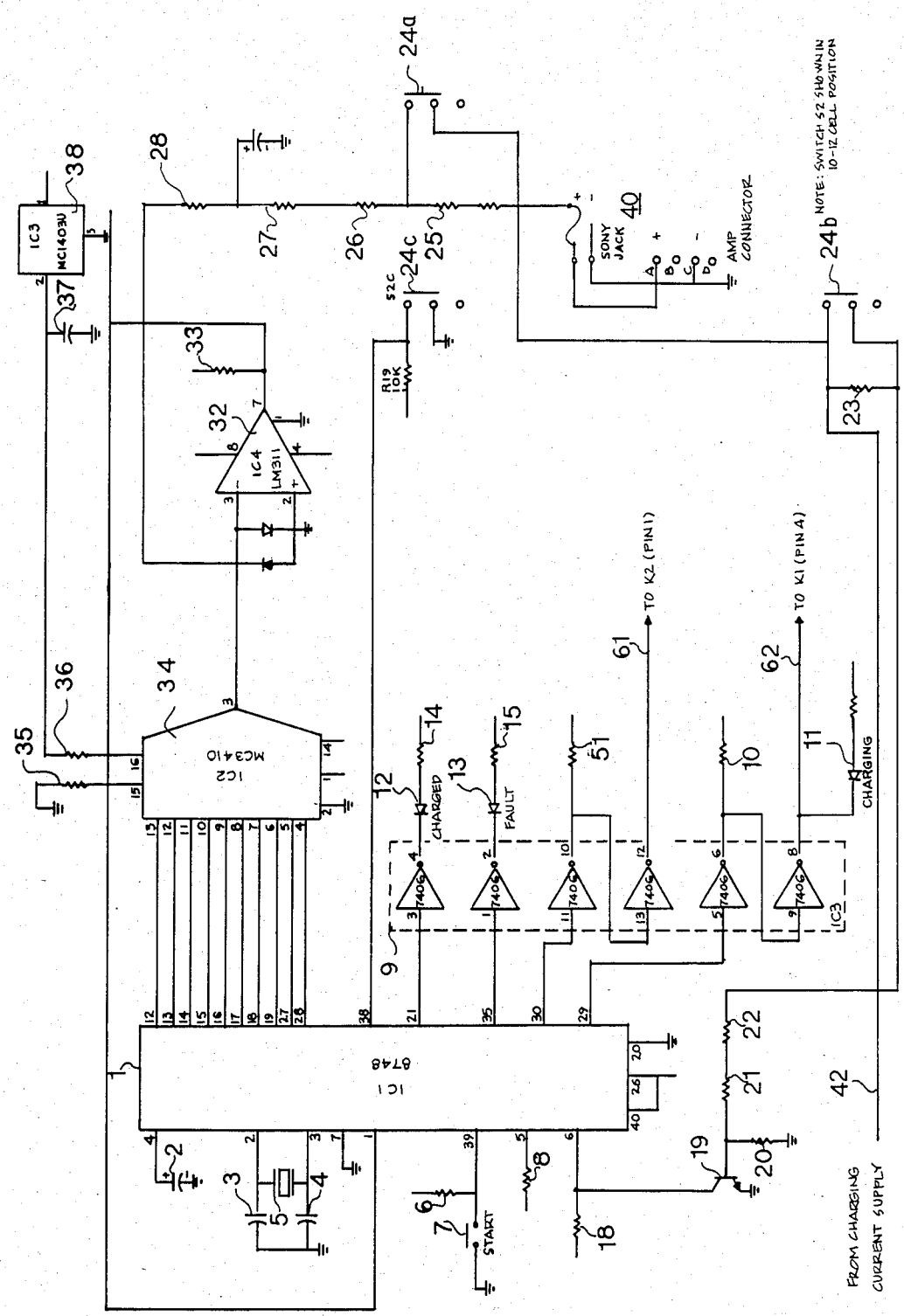
FIG. 5 is a schematic diagram of a third embodiment of a control circuit for a battery charging system constructed according to the principles of the invention.

FIG. 5 is a schematic diagram of a third preferred embodiment of a control circuit to be used with the battery charging system of the invention. This circuit is a modification of the FIG. 2 embodiment and accordingly, like numerals refer to like elements.

The FIG. 5 embodiment differs from that in FIG. 2 by the fact that there are two separate control lines 61 and 62 connected to, respectively, relays 17 and 43. In this embodiment the relays used are preferably zero crossing solid state alternating current relays that control the charging current to the battery pack. The use of two relays allows two levels of charging current to be applied to the battery.

Figure 6:
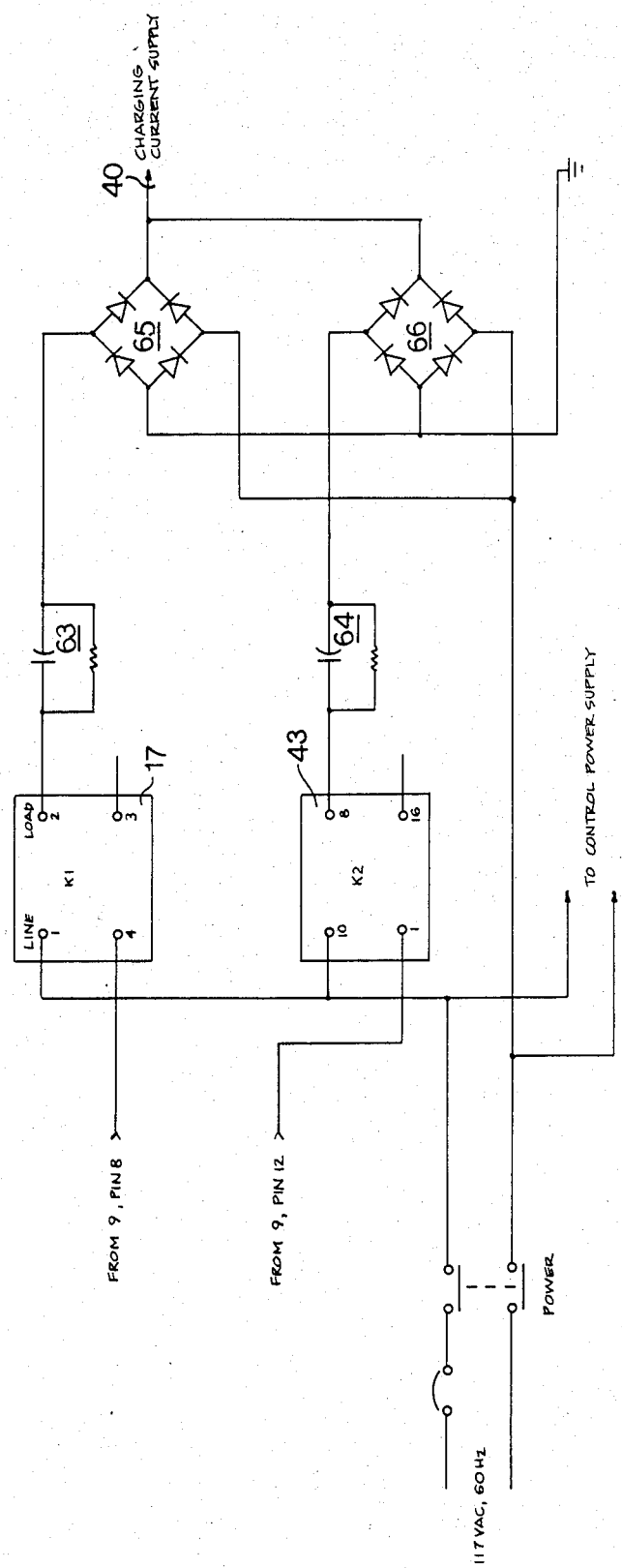
FIG. 6 is a schematic diagram of a charging current supply operated by the FIG. 5 embodiment.

FIG. 6 is a schematic diagram of a preferred form of a charging current power supply to be used with the FIG. 5 embodiment. Relays 17 and 43, respectively, drive capacitor circuits 63 and 64 which meter the current to the battery in proportion to the capacitance values and the alternating current voltage and frequency. Since the alternating current voltage and frequency is relatively constant, the current will be determined by the capacitance in the circuits. Relay 17 drives the main charging circuit, while relay 43 drives a trickle charging circuit. In the illustrated embodiment a 90 microfarad capacitor is used for the capacitor circuit 63 and a 10 microfarad capacitor is used for capacitor circuit 64. Capacitor circuit 63 drives a full wave rectifier 64, and capacitor circuit 64 drives a second full wave rectifier 66. Both rectifier circuits are connected to the charging current supply terminal 40.

In operation both circuits are maintained active during the fast charging cycle for a battery thereby providing in this example a charging current of four amperes.

Upon termination of a main charge, relay 17 is turned off and relay 43 continues to provide a 0.4 ampere trickle charge for an additional five hours.

The FIG. 3 power supplies can be used as the source of the various direct current voltages for the FIG. 5 embodiment. Again, this is merely a conventional power supply circuit so that its construction need not be further described herein.

Figure 7:
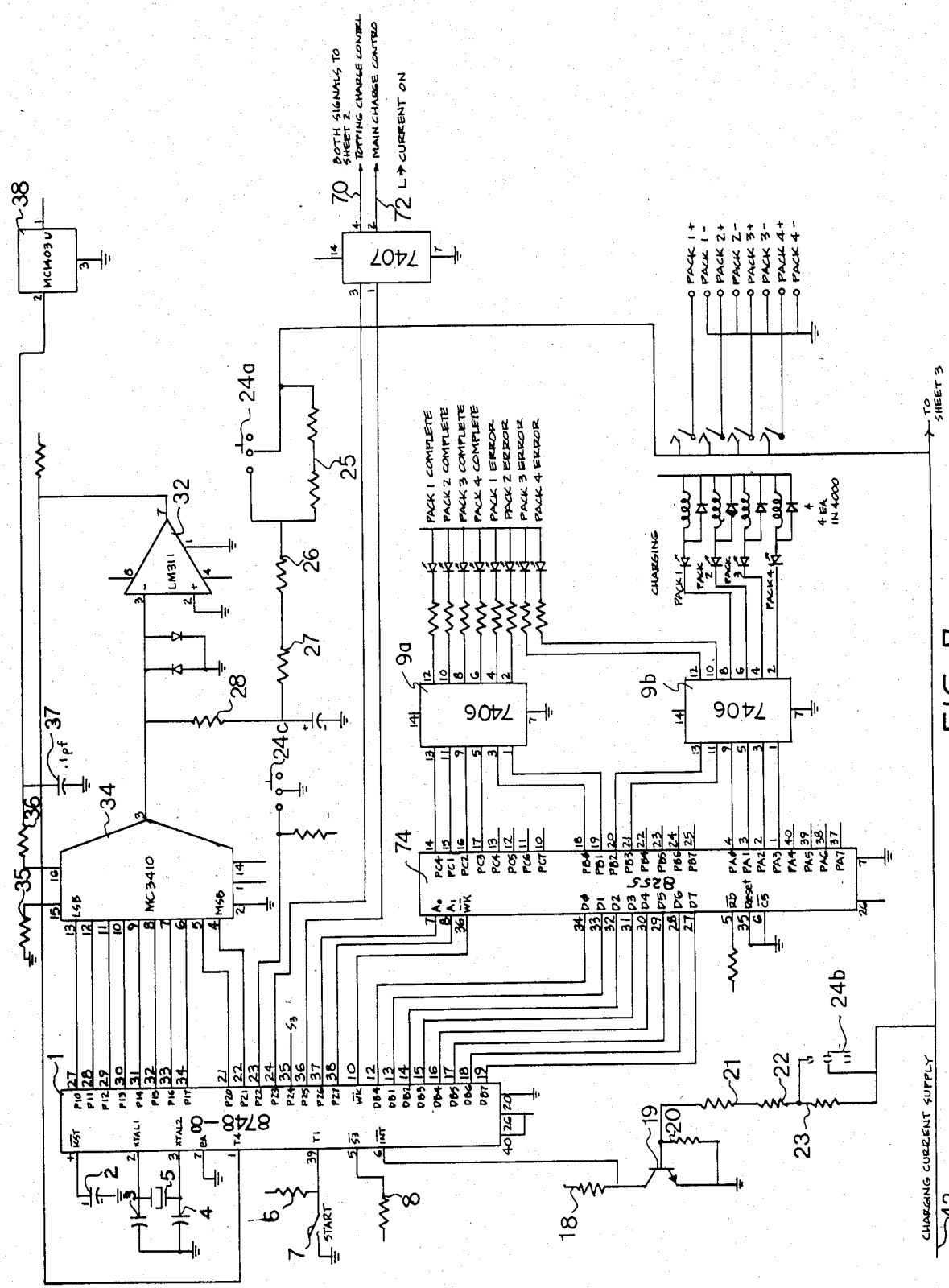
FIG. 7 is a schematic diagram of a fourth embodiment of a control circuit for a battery charging system constructed according to the principles of the invention for a sequencing charging operation.

FIG. 7 is a schematic diagram of a fourth embodiment of a control circuit for a battery charging system according to the invention. In this case, however, a plurality of battery packs are charged in sequence. This control circuit in many ways is constructed and operates like the previously described embodiments, and accordingly, like numerals again refer to like elements.

In FIG. 7 it will be seen that two lines 70 and 72 referred to, respectively, as "topping charge control" and "main charge control" control the charging current by means of two zero crossing solid state relays. These are relays 17 and 43 in FIG. 6 above. Relays 17 and 43 are both activated during the main charging phase of the operation. Upon cessation of fast charging the "topping charge" continues for an additional one-half hour. The functional steps needed for controlling relays 17 and 43 by the FIG. 7 embodiment are the same as those carried by the FIG. 5 embodiment.

Figure 8:
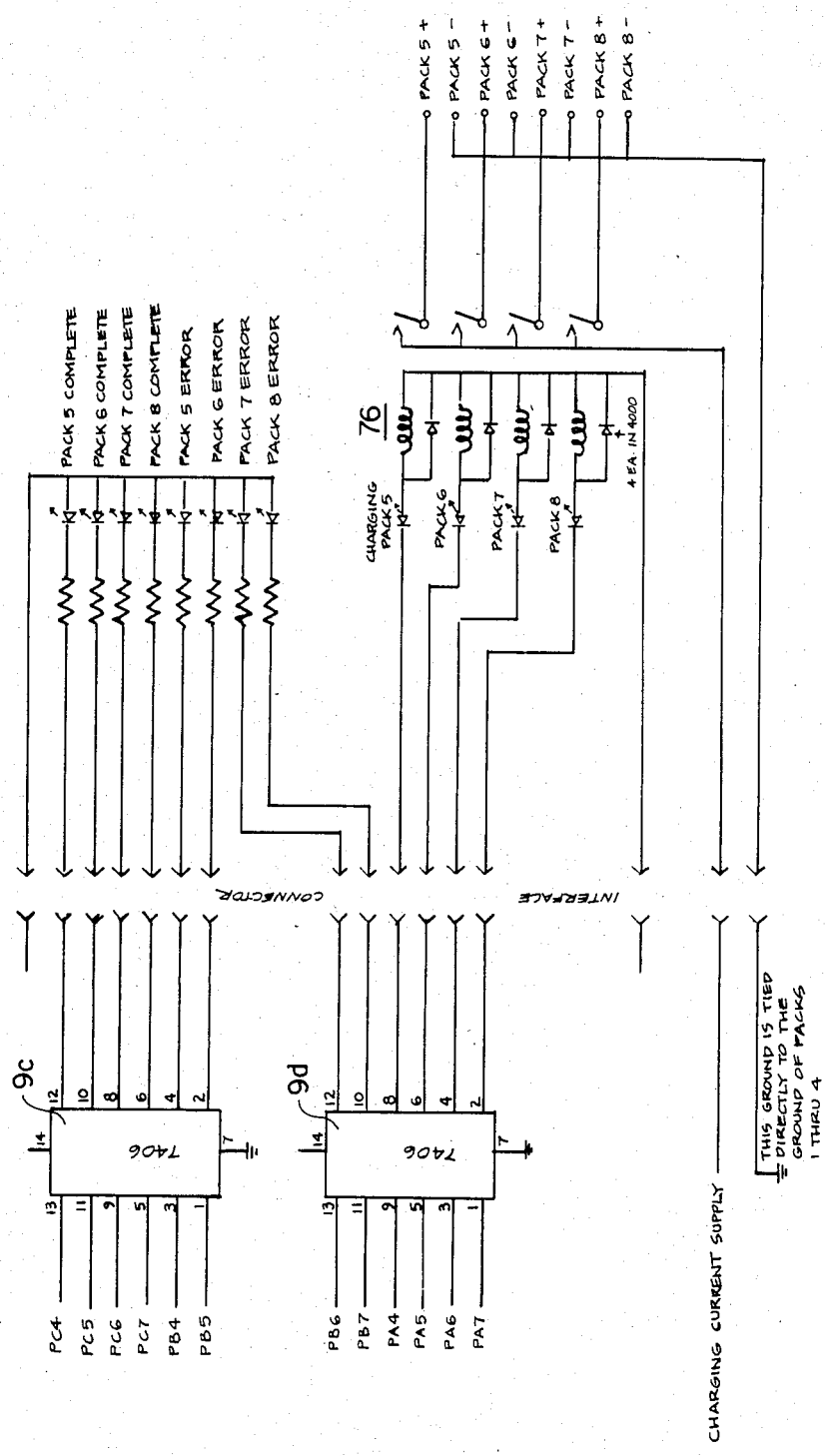
FIG. 8 is a schematic diagram of an expander circuit which might be used with the FIG. 7 embodiment to increase the number of batteries being charged.

In the FIG. 7 embodiment it is necessary to provide a port expander 74 which is in this case a conventional type 8255 port expander. In this embodiment it is necessary to accommodate the control of eight completion indicators and eight error indicators, as well as eight relays. The port expander is used to increase the number of available control lines. The output lines from port expander 74 are connected, respectively, to buffers 9A and 9B, and in FIG. 8 to additional buffers 9C and 9D. The FIG. 7 embodiment has the internal capability of sequentially charging eight battery packs. However, the FIG. 7 embodiment is equipped to receive only four. The additional circuitry shown in FIG. 8 provides the additional buffers and connection circuitry needed to accommodate four additional battery packs.

In this embodiment mechanical relays 76 are used to connect each one of eight battery packs in sequence for charging. Switching of the packs is done prior to the applicaion of charging current in order to prevent damage to the contacts.

The program operating the FIG. 7 embodiment causes the following functions to be performed:

1. When power is turned on an initialization routine is executed to set up the input output ports and to clear the memory.

2. A stop and wait routine is commenced for the start switch to be activated by the operator.

3. Upon activation of the start switch the charging loop is initialized for the first of eight battery packs.

4. The desired battery pack, one of the eight, is connected to the charger.

5. A check is executed for a minimum voltage on the pack to verify that in fact a battery pack is connected. If a minimum voltage is not present, the pack is bypassed (go to Step 15).

6. At this point a discharge routine could be inserted into the program to discharge the pack partially.

7. Charging of the pack is commenced. The status of a front panel pack size switch is checked to determine whether the unit is set up for a small pack or a large pack of cells. It is verified that the pack being charged reaches an initial voltage of either 13.30 volts for ten to twelve cells or 28.60 volts for twenty to twenty-four cells within three minutes. This gives some assurance that there are no shorted or reversed cells.

8. Make an assessment of the pack size (ten, eleven or twelve cells) based on the knee voltage. This allows comparison of the rate of voltage increase with expected threshold values.

9. Check if the pack voltage is greater than a maximum threshold (18 volts) and terminate charging of the pack if more than 18 volts. This allows detection of wrong pack size of incorrect setting of the pack size switch.

10. Measure the knee voltage and calculate 12.5 percent of it. A maximum voltage limit is then placed on the pack equal to the knee voltage plug 12.5 percent. This will cause slow charge packs to terminate charging prior to their fully entering the "gas" phase.

11. Make four successive measurements of the time period required for the digital to analog converter to increment by one bit. Calculate the average of the four measurements and then divide the average by four and store the result. By comparing the time required for each subsequent one-bit increment of the digital to analog converter to the stored value, charging may be terminated when the rate of voltage increase becomes equal to or greater than four times the initial average rate. This terminates charging at the point where a pack is beginning to enter the "gas" phase.

12. The average time period required to increment the digital to analog converter (found in Step 11) is compared to a threshold value based upon the assessment of pack size (found in Step 8) and a maximum charging time limit of either 1.50 hours or 2.50 hours is set. Generally if the pack voltage is initially rising such that the pack would be expected to complete charging in much less than 1.50 hours, the 1.50 hour limit would be set. A slower rate of rise would cause the 2.50 hour limit to be set. Since charge termination via a four-fold increase in rate of voltage rise occurs only when the rate of voltage is low, this method of termination is only used when the 2.50 hour time limit is set.

13. With one additional requirement that the digital to analog converter be incremented at a minimum rate to continue charging, charging may be expected to terminate normally by one of five limits being reached: (1) the rate of voltage rise is below a minimum rate, (2) the maximum voltage limit (calculated as 1.125×knee voltage) is reached, (3) the voltage measurement limit (all ones) of the digital to analog converter being reached, (4) the maximum time limit of either 1.50 or 2.50 hours is reached, (5) the rate of voltage rise becomes four times greater than the initial average rate just after the knee voltage had been reached.

14. Abnormal termination (which aborts charging or connected pack) would be caused by: (1) occurance of an external interrupt due to opening of a connection in the charging circuit or pack being charged, (2) insufficient initial battery voltage (the microprocessor does not recognize a battery as being connected), (3) excessive initial pack voltage (indication of wrong pack size or incorrect setting of pack size switch), (4) the battery does not reach the minimum required voltage after three minutes (indicating possible shorted or reversed cells).

15. Upon normal termination, the charging rate is reduced to a trickle charge for a maximum of 0.50 hour or until a maximum voltage limit is reached at which point all charging is terminated. Upon abnormal termination, all charging is immediately ceased.

16. After all charging has ceased (either through normal or abnormal termination) the current battery pack is disconnected from the charger and an internal counter is incremented so that the next one of the eight battery packs can be charged. If any packs remain to be charged, Step 4 is executed next. If all eight packs have been charged, Step 2 is executed next.

A suitable power supply for providing the direct current voltages needed to operate the FIGS. 7 and 8 embodiments is to be found in FIG. 3.

The variously constructed embodiments described hereinabove are intended only to be exemplary of the principles of the invention. It is contemplated that the described embodiments might be modified or changed without departing from the spirit and scope of the invention as defined in the following claims.

We claim:

1. A method of charging a battery and terminating the charging thereof upon determination of the existence of a prescribed condition comprising the steps of:
    applying charging current to the battery;
    measuring the battery voltage soon after the charging current is applied;
    determining, on the basis of said battery voltage measurement, the knee voltage of the charging characteristic of the particular battery being charged;
    calculating a battery voltage limit beyond which no further charging current is to be applied, said voltage limit being the point at which the instantaneous battery voltage is a pre-determined value greater than the knee voltage of the battery's charging characteristic;
    continued measuring of the battery voltage as said charging current is applied; and
    terminating the application of charging current when said battery voltage limit is reached.

2. The method defined in claim 1 wherein the battery knee voltage is determined and said battery voltage limit is calculated to be the value of said knee voltage plus 12.5 percent of that value.

3. The method defined in claim 1 comprising the additional steps of:
    estimating the number of cells in the battery on the basis of the voltage measured after applying charging current to the battery, measuring a rate of voltage increase for the battery being charged,
    comparing the rate of voltage increase for the battery with a predetermined threshold value set by the estimated number of cells, setting a time limit for the period of time during which the charging current is to be applied to the battery on the basis of said comparison, and
    terminating the application of charging current when said time limit is reached.

4. The method of charging batteries defined in claim 3 comprising the additional steps of:
    storing a value corresponding to the measured rate of voltage increase,
    multiplying said stored value by an empirically determined value,
    comparing subsequently measured rates of voltage increase to said multiplied value,
    terminating the application of charging current when the measured rate of voltage increase equals said multiplied value.

5. The method of charging batteries defined in claim 4 comprising the additional step of detecting a less than minimum increase in voltage within a predetermined period of time, and terminating the application of charging current when said less than minimum increase in voltage occurs over a predetermined time period.

6. The method of charging batteries defined in claim 5 comprising the additional step of:

discharging of the battery before the application of charging current to it.

7. The method of charging batteries defined in claim 1 comprising the additional step of:

terminating the application of charging current to the battery upon the occurrence of an abnormal condition as indicated by one of:

an opening of a connection in the charging circuit or battery, insufficient initial battery voltage, excessive initial battery voltage or failure to reach a predetermined minimum voltage after the elapse of a predetermined period of time.

* * * * *